United States Patent
Zhu

(10) Patent No.: US 11,609,666 B2
(45) Date of Patent: Mar. 21, 2023

(54) ACTIVE CAPACITIVE PEN FOR REALIZING TOUCH OPERATION UNDER MPP PROTOCOL AND USI PROTOCOL AND ELECTRONIC TERMINAL

(71) Applicant: Shenzhen Goodix Technology Co., Ltd., Guangdong (CN)

(72) Inventor: Dingwei Zhu, Guangdong (CN)

(73) Assignee: Shenzhen Goodix Technology Co., Ltd., Guangdong (CN)

( * ) Notice: Subject to any disclaimer, the term of this patent is extended or adjusted under 35 U.S.C. 154(b) by 0 days.

(21) Appl. No.: 17/488,285

(22) Filed: Sep. 28, 2021

(65) Prior Publication Data

US 2022/0137747 A1    May 5, 2022

Related U.S. Application Data

(63) Continuation of application No. PCT/CN2020/126526, filed on Nov. 4, 2020.

(51) Int. Cl.
| | |
|---|---|
| G06F 3/044 | (2006.01) |
| G06F 3/0354 | (2013.01) |
| G06F 3/041 | (2006.01) |
| G06F 3/038 | (2013.01) |

(52) U.S. Cl.
CPC .......... *G06F 3/0442* (2019.05); *G06F 3/0383* (2013.01); *G06F 3/03545* (2013.01); *G06F 3/04162* (2019.05)

(58) Field of Classification Search
CPC .............................. G06F 3/0442; G06F 3/04162
See application file for complete search history.

(56) References Cited

U.S. PATENT DOCUMENTS

| | | | |
|---|---|---|---|
| 2011/0193776 A1* | 8/2011 | Oda .................. | G06F 3/0446 345/157 |
| 2017/0068330 A1* | 3/2017 | Navidpour .......... | G06F 3/0442 |
| 2017/0068337 A1* | 3/2017 | Bhandari ............. | H01G 5/12 |
| 2018/0196533 A1 | 7/2018 | Zeliff et al. | |
| 2019/0018520 A1* | 1/2019 | Kuo .................... | G06F 3/0441 |
| 2019/0056803 A1* | 2/2019 | Nussbaum ........... | G06F 3/0383 |
| 2020/0089342 A1 | 3/2020 | Oda et al. | |

FOREIGN PATENT DOCUMENTS

| | | |
|---|---|---|
| CN | 105975109 A | 9/2016 |
| CN | 109240521 A | 1/2019 |
| CN | 110851006 A | 2/2020 |

OTHER PUBLICATIONS

Shenzhen Goodix Technology Co., Ltd., International Search Report, PCT/CN2020/126526, dated Aug. 6, 2021, 5 pgs.

* cited by examiner

*Primary Examiner* — Chun-Nan Lin
(74) *Attorney, Agent, or Firm* — USCH Law, PC

(57) ABSTRACT

An active capacitive pen is disclosed, including: a barrel; a first electrode disposed at an end of the barrel, an end of the first electrode away from the barrel serving as a tip of the active capacitive pen; a second electrode disposed on the barrel and spaced apart from the first electrode in an axial direction of the barrel; a third electrode disposed on the barrel and located between the first electrode and the second electrode in the axial direction of the barrel; a switching circuit, connected with the second electrode and the third electrode and configured to electrically connect the third electrode with the first electrode, or disconnect the third electrode from the second electrode. Also disclosed is an electronic terminal with the active capacitive pen.

18 Claims, 3 Drawing Sheets

ACTIVE CAPACITIVE PEN FOR REALIZING TOUCH OPERATION UNDER MPP PROTOCOL AND USI PROTOCOL AND ELECTRONIC TERMINAL

CROSS REFERENCE TO RELATED APPLICATIONS

The present application is a continuation of PCT Application No. PCT/CN2020/126526, filed Nov. 4, 2020, which is incorporated by reference herein in its entirety.

TECHNICAL FIELD

The present disclosure relates to the field of capacitive touch technology, in particular to an active capacitive pen and an electronic terminal.

BACKGROUND

With the development of technology, capacitive touch technology has become a mainstream touch technology for mobile devices, and the combination of active capacitive pens and capacitive touch screens has become increasingly popular in electronic products such as tablet computers, mobile phones, and display screens, which has greatly improved the efficiency and convenience of people using the functions of selecting, tracing, drawing, and writing in daily meetings, lectures, and discussions.

The inventor found that the existing technology has at least the following problems: the current mainstream active pens mainly adopt the MPP (Microsoft Pen Protocol) protocol, USI (Universal Stylus Initiative) protocol, or the protocol of Apple, etc., and currently only MPP and USI protocols can acquire shared resources. Since various protocols have respective coding methods, transmission methods, tip structures and design requirements for a flat-end, most of the active pens on the market currently support only one protocol, and cannot realize both touch operations under the MPP protocol and the USI protocol.

SUMMARY

Some embodiments of the present disclosure aim to provide an active capacitive pen and an electronic terminal, which can realize both touch operations under the MPP protocol and the USI protocol.

Some embodiments of the present disclosure provide an active capacitive pen configured to interact with a capacitive touch screen. The active capacitive pen includes a barrel, a first electrode, a second electrode, a third electrode and a switching circuit. The first electrode is disposed at an end of the barrel, and configured to send a signal to the capacitive touch screen. The first electrode includes a tip at an end of the first electrode away from the barrel to serve as a tip of the active capacitive pen. The second electrode is disposed on the barrel and spaced apart from the first electrode in an axial direction of the barrel, and configured to receive a signal transmitted from the capacitive touch screen and transmit a signal to the capacitive touch screen. The third electrode is disposed on the barrel and located between the first electrode and the second electrode in the axial direction of the barrel. The switching circuit is coupled between the second electrode and the third electrode. The switching circuit is configured to electrically connect the third electrode with the second electrode in a first working state and disconnect the third electrode from the second electrode in a second working state.

Some embodiments of the present disclosure also provide an electronic terminal, including: a capacitive touch screen and an active capacitive pen compatible with the capacitive touch screen. The active capacitive pen is an active capacitive pen as described above.

Compared with the existing technology, in the embodiments of the present disclosure, the active capacitive pen are provided with the tree electrodes, in which the third electrode is disposed between the first electrode and the second electrode in the axial direction of the barrel, such that:

a. When the switching circuit electrically connects the third electrode with the second electrode in the first working state, the first electrode at the front end of the barrel serves as the TIP electrode, and the second electrode and the third electrode jointly serve as the signal transmitting and receiving electrode, so as to enable the capacitive pen to be compatible with the USI protocol. Although the second electrode and the first electrode are separated by the third electrode and thus the second electrode is far away from the capacitive touch screen when the capacitive pen is in use, the third electrode connected to the second electrode reduces the height of the lower edge of the signal transmitting and receiving electrode, so that the signal transmitting and receiving electrode has it height reduced when the capacitive pen is in use, and meanwhile has its area increased. The reduction in height and the increase in area may prevent an amount of uplink signals received by the signal transmitting and receiving electrode being small, and solve a problem of insufficient amount of uplink signals caused by a large palm of a user;

b. When the switching circuit disconnects the third electrode from the second electrode in the second working state, the first electrode at the front end of the barrel serves as the TIP electrode for sending signals, and merely the second electrode serves as the signal transmitting and receiving electrode, so as to enable the capacitive pen to be compatible with the MPP protocol. Since the second electrode and the first electrode are separated by the third electrode, which enables the second electrode to be far away from the capacitive touch screen when the capacitive pen is in use, so as to avoid a problem that accuracy of angle measurement is reduced due to an insufficient height of the second electrode;

Therefore, by switching the different working states of the switching circuit, the active capacitive pen takes into account different structural designs required for the MPP protocol and the USI protocol, and realizes both touch operations under the MPP protocol and the USI protocol.

In an example, the switching circuit is further configured to ground the third electrode in the second working state. In this way, it is possible to reduce interference of receiving signals of the second electrode caused by the third electrode when the second electrode disconnects from the third electrode and separately serves as the signal receiving/transmitting electrode.

In an example, the second electrode is ring-shaped and disposed on the barrel around the axial direction, and a distance between a lower edge of the second electrode and the end of the first electrode in the axial direction of the barrel is not less than 5.8 mm. In this way, a distance between the lower edge of the second electrode and the capacitive touch screen is at least 5.8 mm when the capacitive pen is in use, so that the height of the second electrode is sufficiently high but without trading off miniaturization design of the capacitive pen, thereby ensuring sufficient accuracy of angle measurement.

In an example, the third electrode is ring-shaped and disposed on the barrel around the axial direction, and a distance between a lower edge of the third electrode and the end of the first electrode in the axial direction of the barrel is not more than 3.7 mm. In this way, a distance between the Ring electrode (including the second electrode and the third electrode) and the capacitive touch screen is at least 3.7 mm when the capacitive pen is in use, and ensures that the amount of uplink signals received by the Ring electrode is large enough while satisfying the requirement for miniaturization design of the capacitive pen.

In an example, a length of the first electrode in the axial direction of the barrel is 3.5 mm to 3.7 mm. This further satisfies the requirement for miniaturization design of the capacitive pen and ensures that the amount of uplink signals received by the Ring electrode of the capacitive pen (working under the USI protocol) is large enough.

In an example, a length of the third electrode in the axial direction of the barrel is 2.1 mm to 2.4 mm. This facilitates the miniaturization design of the capacitive pen and ensures sufficient accuracy of angle measurement by the Ring electrode of the capacitive pen (working under the MPP protocol).

In an example, a length of the second electrode in the axial direction of the barrel is 3.0 mm to 6.4 mm. This facilitates the miniaturization design of the capacitive pen, and further increases the amount of uplink signals received by the Ring electrode (working under the USI protocol) by increasing the size of the second electrode.

In an example, the length of the second electrode in the axial direction of the barrel is 3.0 mm to 3.5 mm. This ensures the amount of uplink signals received by the Ring electrode (working under the USI protocol) and further satisfies the requirement for miniaturization design of the capacitive pen.

In an example, the switching circuit includes an optocoupler switch. An output end of the optocoupler switch is electrically connected with the second electrode and the third electrode. The switching circuit is switchable between the first working state and the second working state by turning on and off the optocoupler switch. With the optocoupler switch electrically connecting or disconnecting the second electrode and the third electrode, there is no direct electrical connection between the input end of the optocoupler switch and a signal circuit of the second electrode, which avoids interference therebetween.

BRIEF DESCRIPTION OF THE DRAWINGS

One or more embodiments are exemplified by the figures in the corresponding drawings. These exemplified descriptions do not constitute a limitation to the embodiments. The elements with the same reference numerals in the drawings are represented as similar elements. Unless otherwise stated, the figures in the drawings do not constitute a scale limitation.

DETAILED DESCRIPTION

Figure 1:
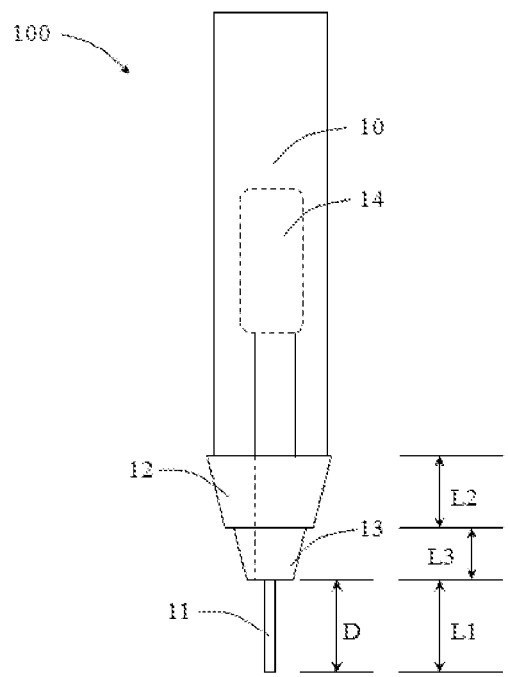
FIG. 1 is a schematic structural diagram of an active capacitive pen according to a first embodiment of the present disclosure.

In order to make the objectives, technical solutions, and advantages of the present disclosure clearer, some embodiments of the present disclosure are further described in detail below with reference to the accompanying drawings and embodiments. Those skilled in the art can understand that in various embodiments, many technical details are set forth in order to provide the reader with a better understanding of the present disclosure. However, the technical solution claimed in the present disclosure can be implemented without these technical details and various changes and modifications based on the following embodiments. The division of the following embodiments is for convenience of description, and should not constitute any limitation on the specific implementation of the present disclosure, and the various embodiments may be combined with and referenced to each other without contradiction.

A first embodiment of the present disclosure relates to an active capacitive pen, which is applicable to a capacitive touch screen, and configured to interact with the capacitive touch screen. The active capacitive pen includes: a barrel; a first electrode disposed at an end of the barrel, where the first electrode is configured to send a signal to the capacitive touch screen, and includes a tip at an end of the first electrode away from the barrel to serve as a tip of the active capacitive pen; a second electrode disposed on the barrel and spaced apart from the first electrode in an axial direction of the barrel, where the second electrode is configured to receive a signal transmitted from the capacitive touch screen and transmit a signal to the capacitive touch screen; a third electrode disposed on the barrel and located between the first electrode and the second electrode in the axial direction of the barrel; a switching circuit coupled between the second electrode and the third electrode, where the switching circuit is configured to electrically connect the third electrode with the second electrode in a first working state, and disconnect the third electrode from the second electrode in a second working state.

The core of the present embodiment is that the third electrode is additionally provided between the first electrode as a tip electrode and the second electrode, so that the capacitive pen is adaptable to either the USI protocol or the MPP protocol by switching of the switching circuit:

When the capacitive pen is in use under the USI protocol, the second electrode and the third electrode are electrically connected to jointly serve as a signal transmitting and receiving electrode. Thus, on the one hand, with the third electrode closer to the first electrode, a height of a lower edge of the entire signal transmitting and receiving electrode is reduced. On the other hand, an area of the signal transmitting and receiving electrode is increased. The reduction in height and the increase in the area prevent an amount of uplink signals received by the signal transmitting and receiving electrode being small, and solve a problem of insufficient amount of uplink signals caused by a large palm of a user;

When the capacitive pen is in use under the MPP protocol, the second electrode and the third electrode are disconnected, and merely the second electrode serves as a signal transmitting and receiving electrode. Since the second electrode and the first electrode is separated by the third electrode, the second electrode is located farther away from the capacitive touch screen when the capacitive pen is in use, avoiding a problem that accuracy of angle measurement is reduced due to an insufficient height of the second electrode.

Implementation details of the active capacitive pen of the present embodiment will be described in detail below. The following content is only provided for ease of understanding and is not necessary for implementing this solution.

Referring to FIG. 1, a first embodiment of the present disclosure provides an active capacitive pen 100 applicable to a capacitive touch screen (not shown), including a barrel 10, a first electrode 11, a second electrode 12, a third electrode 13 and a switching circuit 14.

As a main structure of the active capacitive pen 100, the barrel 10 is configured to support other components of the active capacitive pen 100. In order to be electrically isolated from other electrical components, in this embodiment, the barrel 10 is made of insulating material and has a hollow structure with a receiving cavity. In this way, the receiving cavity may be configured to accommodate a controller electrically connected to the first electrode 11, the second electrode 12 and the third electrode 13 and controlling the active capacitive pen 100 to transmit signals to and receive signals from the capacitive touch screen for touch operation. Alternatively, it is should be appreciated that when an appearance design of the active capacitive pen 100 is not highly demanded, the barrel 10 may be made into a solid structure, and the controller may be additionally provided on an end or an outer wall of the barrel 10.

The first electrode 11 is disposed at a front end of the barrel 10 and configured to send a signal to the capacitive touch screen, and an end of the first electrode 11 away from the barrel 10 (hereinafter referred to as the end) serves as a tip of the active capacitive pen 100. In this embodiment, the first electrode 11 is of a column shape, such as a cylinder. In this way, the cylindrical first electrode 11 has one end fixed to the barrel 10 and the one other end away from the barrel 10 serving as the tip of the active capacitive pen 100. It should be noted that the shape of the first electrode 11 is not limited to a cylindrical shape. In other embodiments, the first electrode 11 may alternatively be of a cone or a frustum whose vertex has a smooth curved surface. In this way, a bottom of the cone-shaped or frustum-shaped first electrode 11 has a large size to be capable of firmly connecting to the barrel 10, and meanwhile a top of the cone-shaped or frustum-shaped first electrode 11 has a small size and is smoothly curved, which is suitable to be used as a tip and is not easy to scratch the capacitive touch screen. In consideration of the above factors, a diameter of the end of the first electrode 11 away from the barrel 10 is not less than 1.72 mm. In one example, the diameter of the end of the first electrode 11 away from the barrel 10 is 1.72 mm.

The second electrode 12 is disposed on the barrel 10 and is spaced apart from the first electrode 11 in the axial direction of the barrel 10 (a length direction of the barrel 10, that is, a vertical direction of the drawing shown in FIG. 1). The second electrode 12 is configured to receive a signal transmitted from the capacitive touch screen. In this embodiment, the first electrode 11 and the second electrode 12 are spaced apart from each other and far away from each other, so that interference between them may be avoided.

The third electrode 13 is disposed on the barrel 10 and located between the first electrode 11 and the second electrode 12 in the axial direction of the barrel 10.

The switching circuit 14 is coupled between the second electrode 12 and the third electrode 13. The switching circuit 14 electrically connects the third electrode 13 with the second electrode 12 in a first working state, and disconnects the third electrode 13 from the second electrode 12 in a second working state. It should be noted that the switching circuit 14 may be disposed in the hollow barrel 10 to realize the electrical connection and disconnection between the second electrode 12 and the third electrode 13. Specifically, the switching circuit 14 may be a single-pole switch, an optocoupler switch, etc. connected between the second electrode 12 and the third electrode 13.

Figure 2:
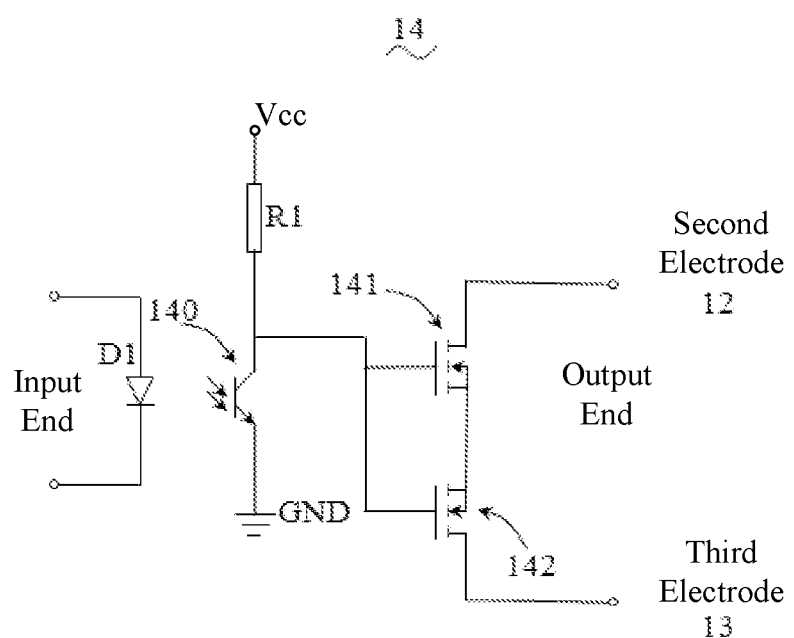
FIG. 2 is a schematic structural diagram of a switching circuit of the active capacitive pen according to the first embodiment of the present disclosure.

In an example, the switching circuit 14 includes an optocoupler switch having an input end, an output end, a light-emitting diode D1, a phototransistor 140, a MOS transistor 141, and a MOS transistor 142 as shown in FIG. 2. The input end of the optocoupler switch is connected to anode and cathode terminals of the light-emitting diode D1 for controlling light-emitting of the light-emitting diode D1. The MOS transistors 141 and 142 are connected to the output end of the optocoupler switch which is in turn electrically connected to the second electrode 12 and the third electrode 13.

When the light-emitting diode D1 is turned off and does not emit light, the phototransistor 140 is turned off, and a Vcc power supply directly pull up a grid voltage of the N-channel MOSFETs (Metal-Oxide-Semiconductor Field-Effect Transistor, hereinafter referred to as MOS transistor) 141 and 142 through a resistor R1. At this moment, the MOS transistors 141 and 142 are turned on, the second electrode 12 and the third electrode 13 are electrically connected to each other, and the switching circuit 14 is in the first working state. When the light-emitting diode D1 is turned on and emits light, the phototransistor 140 is turned on, thereby pulling down the grid voltage of the N-channel MOS transistors 141 and 142. At this moment, the MOS transistors 141 and 142 are turned off, the second electrode 12 and the third electrode 13 are electrically disconnected, and the switching circuit 14 is in the second working state. In this way, the switching circuit 14 switches between the first working state and the second working state by turning on and off the optocoupler switch. Moreover, there is no direct electrical connection between the input end of the optocoupler switch and a signal circuit of the second electrode 12, which avoids interference therebetween.

As mentioned above, in the first embodiment of the present disclosure, the active capacitive pen 100 are provided with the tree electrodes, in which the third electrode 13 is disposed between the first electrode 11 and the second electrode 12 in the axial direction of the barrel 10, such that:

a. When the switching circuit 14 electrically connects the third electrode 13 with the second electrode 12 in the first working state, the first electrode 11 at the front end of the barrel 10 serves as the TIP electrode, and the second electrode 12 and the third electrode 13 jointly serve as the signal transmitting and receiving electrode, so as to enable the capacitive pen to be compatible with the USI protocol. Although the second electrode 12 and the first electrode 11 are separated by the third electrode 13 and thus the second electrode 12 is far away from the capacitive touch screen when the capacitive pen is in use, the third electrode 13 connected to the second electrode 12 reduces the height of the lower edge of the signal transmitting and receiving electrode, so that the signal transmitting and receiving electrode has it height reduced when the capacitive pen is in use, and meanwhile has its area increased. The reduction in height and the increase in area may prevent an amount of uplink signals received by the signal transmitting and receiving electrode being small, and solve a problem of insufficient amount of uplink signals caused by a large palm of a user;

b. When the switching circuit 14 disconnects the third electrode 13 from the second electrode 12 in the second working state, the first electrode 11 at the front end of the barrel 10 serves as the TIP electrode for sending signals, and merely the second electrode 12 serves as the signal transmitting and receiving electrode, so as to enable the capacitive pen to be compatible with the MPP protocol. Since the second electrode 12 and the first electrode 11 are separated by the third electrode 13, which enables the second electrode 12 to be far away from the capacitive touch screen when the capacitive pen is in use, so as to avoid a problem that accuracy of angle measurement is reduced due to an insufficient height of the second electrode 12;

Therefore, by switching the different working states of the switching circuit 14, the active capacitive pen 100 takes into account different structural designs required for the MPP protocol and the USI protocol, and realizes both touch operations under the MPP protocol and the USI protocol.

In an example, the second electrode 12 may be a ring-shaped electrode (hereinafter referred to as a Ring electrode) disposed on the barrel 10 around the axial direction of the barrel 10. It should be noted that when the capacitive pen is in use under the MPP protocol, both the TIP electrode and the Ring electrode are used as transmitting electrodes to transmit signals, and data received by the second electrode 12 that is located higher than the TIP electrode is used to measure an inclination angle of the capacitive pen. The second electrode 12 needs to be located far away from the capacitive touch screen (that is, the height of the second electrode 12 needs to be sufficiently high) to be able to improve accuracy of the inclination angle measurement. Therefore, furthermore, in this embodiment, a distance between a lower edge of the second electrode 12 and the end of the first electrode 11 in the axial direction of the barrel is not less than 5.8 mm. In this way, the distance between the lower edge of the second electrode 12 as the Ring electrode and the capacitive touch screen is at least 5.8 mm when the capacitive pen is used under the MPP protocol, so that the height of the second electrode 12 is sufficiently high but without trading off miniaturization design of the capacitive pen (e.g., the capacitive pen should not be too long), thereby ensuring that angle measurement data with higher accuracy is obtained according to the data received by the second electrode 12 when the capacitive pen is in use under the MPP protocol. In an example, the second electrode 12 has a length L2 of 3.0 mm to 6.4 mm in the axial direction of the barrel 10, which facilitates the miniaturization design of the capacitive pen, and further increases the amount of uplink signals received by the Ring electrode (under the USI protocol) by increasing the size of the second electrode 12. In an example, the second electrode 12 has a length L2 of 3.0 mm to 3.5 mm in the axial direction of the barrel 10, which ensures sufficient amount of uplink signals received by the Ring electrode (under USI protocol), and further satisfies the requirement for miniaturization design of the capacitive pen. Specifically, in this embodiment, the length L2 of the second electrode 12 in the axial direction of the barrel 10 is 3.0 mm.

Correspondingly, in this embodiment, the third electrode 13 may also be a ring-shaped electrode disposed on the barrel 10 around the axial direction of the barrel 10. The ring-shaped third electrode 13 and the ring-shaped second electrode 12 are electrically connected to jointly form a Ring electrode. In addition, in order to make the Ring electrode (including the second electrode 12 and the third electrode 13) is closer to the capacitive touch screen to increase the amount of uplink signals received by the Ring electrode, in an example, a distance D between a lower edge of the third electrode 13 and the end of the first electrode 11 in the axial direction of the barrel 10 is not greater than 3.7 mm.

Since the distance D between the lower edge of the third electrode 13 and the end of the first electrode 11 in the axial direction of the barrel 10 is not greater than 3.7 mm, furthermore, the first electrode 11 may has a length L1 of 3.5 mm to 3.7 mm in the axial direction of the barrel 10, which further satisfies the requirement for miniaturization design of the capacitive pen and ensures that the amount of uplink signals received by the Ring electrode of the capacitive pen (working under the USI protocol) is large enough. In other words, when the length L1 of the first electrode 11 in the axial direction of the barrel 10 is less than 3.7 mm, the third electrode 13 and the first electrode 11 are spaced apart from each other in the axial direction of the barrel 10; when the length L1 of the first electrode 11 in the axial direction of the barrel 10 is 3.7 mm, the third electrode 13 and the first electrode 11 are disposed adjacently in the axial direction of the barrel 10. Specifically, in this embodiment, the length L1 of the first electrode 11 in the axial direction of the barrel 10 is 3.5 mm.

In an example, the third electrode 13 has a length L3 of 2.1 mm to 2.4 mm in the axial direction of the barrel 10, which facilitates the miniaturization design of the capacitive pen and ensures sufficient accuracy of angle measurement by the Ring electrode of the capacitive pen (working under the MPP protocol). Specifically, in this embodiment, the length L3 of the third electrode 13 in the axial direction of the barrel 10 is 2.4 mm.

It should be noted that the above-mentioned examples in this embodiment are all illustrations for ease of understanding, and do not constitute a limitation to the technical solutions of the present disclosure.

Figure 3:
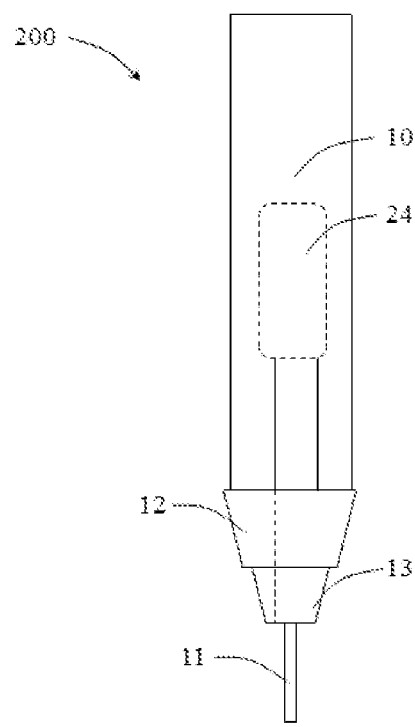
FIG. 3 is a schematic structural diagram of an active capacitive pen according to a second embodiment of the present disclosure.

Referring to FIG. 3, a second embodiment of the present disclosure provides a further active capacitive pen 200. The structure of the active capacitive pen 200 provided in the second embodiment of the present disclosure is generally the same as that of the active capacitive pen 100 provided in the first embodiment. The active capacitive pen 200 also includes the barrel 10, the first electrode 11, the second electrode 12, the third electrode 13 and the switching circuit 24. Different from the active capacitive pen 100 provided in the first embodiment, when the switching circuit 24 of the active capacitive pen 200 provided in the second embodiment disconnects the third electrode 13 from the second electrode 12 in the second working state, the third electrode 13 is further grounded.

Figure 4:
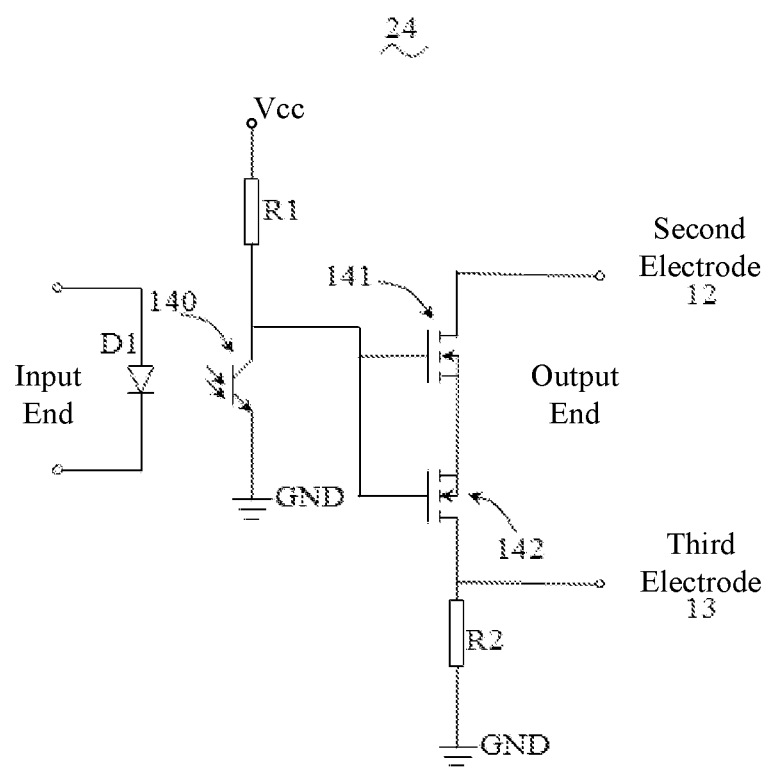
FIG. 4 is a schematic structural diagram of a switching circuit of the active capacitive pen according to the second embodiment of the present disclosure.

Specifically, in this embodiment, the switching circuit 24 includes an optocoupler switch as shown in FIG. 4, and an input end of the optocoupler switch is connected to anode and the cathode terminals of a light emitting diode D1 for controlling light-emitting of the light emitting diode D1. The MOS transistors 141 and 142 are connected to an output end of the optocoupler switch which is in turn electrically connected to the second electrode 12 and the third electrode 13, and a drain electrode of the MOS transistor 142 is connected to the third electrode 13 and further grounded via a resistor R2.

When the light-emitting diode D1 is turned off and does not emit light, the phototransistor 140 is turned off, and the Vcc power supply directly pulls up a grid voltage of the N-channel MOS transistors 141 and 142 through a resistor R1. At this moment, the MOS transistors 141 and 142 are turned on, the second electrode 12 and the third electrode 13 are electrically connected to each other, and the switching circuit 14 is in the first working state. When the light-emitting diode D1 is turned on and emits light, the phototransistor 140 is turned on, thereby pulling down the grid voltage of the N-channel MOS transistors 141, 142. At this moment, the MOS transistors 141 and 142 are turned off, the second electrode 12 and the third electrode 13 are electrically disconnected, the switching circuit 14 is in the second working state, and the third electrode 13 is grounded via the resistor R2. In this way, it is possible to reduce interference of receiving signals of the second electrode 12 caused by the third electrode 13 when the second electrode 12 disconnects from the third electrode 13 and separately serves as a signal receiving/transmitting electrode to receive/send signals.

Figure 5:
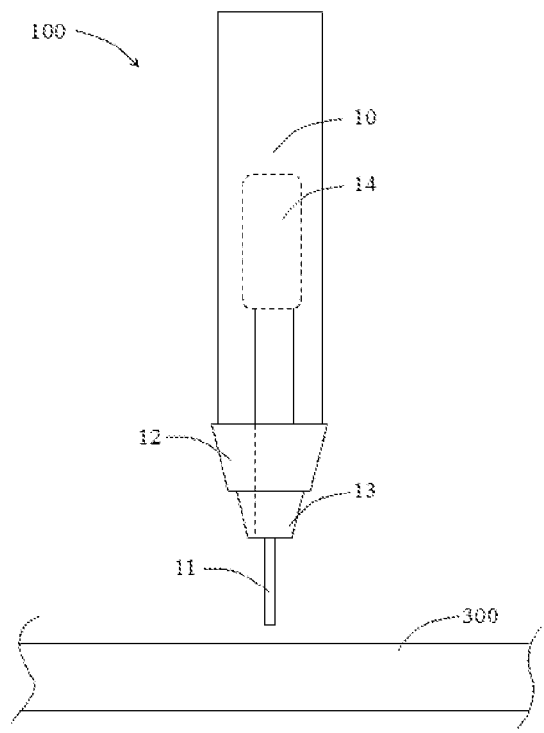
FIG. 5 is a schematic structural diagram of an electronic terminal according to a third embodiment of the present disclosure.
Figure 6:
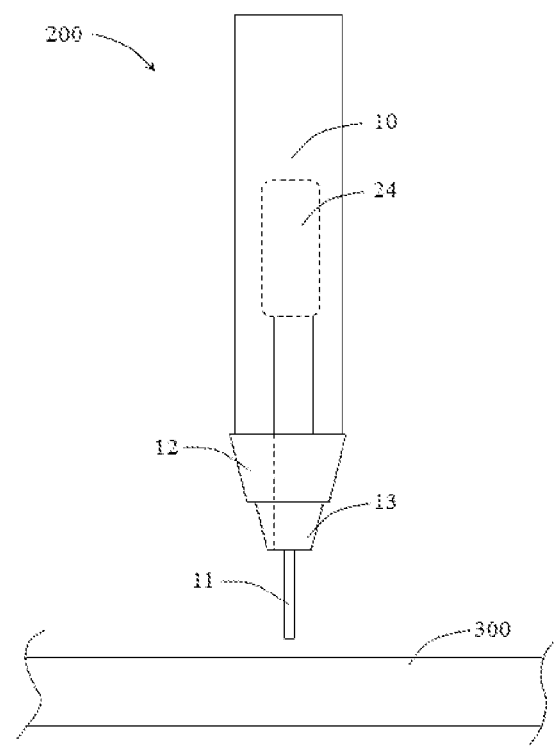
FIG. 6 is a schematic structural diagram of another electronic terminal according to a fourth embodiment of the present disclosure.

In addition, referring to FIG. 5 and FIG. 6, a third embodiment of the present disclosure also provides an electronic terminal. The electronic terminal includes a capacitive touch screen 300 and the aforementioned active capacitive pen 100 (as shown in FIG. 5); or, the electronic terminal includes a capacitive touch screen and the aforementioned active capacitive pen 200 (shown in FIG. 6). The active capacitive pen 100 or 200 is compatible with the capacitive touch screen 300. By switching the different working states of the switching circuit 14 or 24, the active capacitive pen 100 or 200 can take into account different structural designs required for the MPP protocol and the USI protocol, and realize both touch operations under the MPP protocol and the USI protocol.

Those skilled in the art can understand that the above-mentioned embodiments are specific examples for realizing the present disclosure, and in practical applications, various changes can be made in form and details without departing from the spirit and scope of the present disclosure.

What is claimed is:

1. An active capacitive pen, configured to communicate with a capacitive touch screen interactively, comprising:
   a barrel;
   a first electrode disposed at an end of the barrel, wherein the first electrode is configured to send a signal to the capacitive touch screen, and an end of the first electrode away from the barrel serves as a tip of the active capacitive pen;
   a second electrode disposed on the barrel and spaced apart from the first electrode in an axial direction of the barrel, wherein the second electrode is configured to receive a signal transmitted from the capacitive touch screen and transmit a signal to the capacitive touch screen;
   a third electrode disposed on the barrel and located between the first electrode and the second electrode in the axial direction of the barrel; and
   a switching circuit connected with the second electrode and the third electrode, wherein the switching circuit is configured to electrically connect the third electrode with the second electrode in a first working state and disconnect the third electrode from the second electrode in a second working state,
   wherein in the first working state, the second electrode and the third electrode jointly serve as a signal transmitting and receiving electrode, to enable the active capacitive pen to be compatible with a first protocol; in the second working state, only the second electrode serves as a signal transmitting and receiving electrode, to enable the active capacitive pen to be compatible with a second protocol.

2. The active capacitive pen according to claim 1, wherein the switching circuit is further configured to ground the third electrode in the second working state.

3. The active capacitive pen according to claim 1, wherein the second electrode is ring-shaped and disposed on the barrel around the axial direction, and a distance between a lower edge of the second electrode and the end of the first electrode in the axial direction of the barrel is not less than 5.8 mm.

4. The active capacitive pen according to claim 3, wherein the third electrode is ring-shaped and disposed on the barrel around the axial direction, and a distance between a lower edge of the third electrode and the end of the first electrode in the axial direction of the barrel is not more than 3.7 mm.

5. The active capacitive pen according to claim 4, wherein a length of the first electrode in the axial direction of the barrel is 3.5 mm to 3.7 mm.

6. The active capacitive pen according to claim 5, wherein a length of the third electrode in the axial direction of the barrel is 2.1 mm to 2.4 mm.

7. The active capacitive pen of claim 3, wherein a length of the second electrode in the axial direction of the barrel is 3.0 mm to 6.4 mm.

8. The active capacitive pen according to claim 7, wherein the length of the second electrode in the axial direction of the barrel is 3.0 mm to 3.5 mm.

9. The active capacitive pen according to claim 1, wherein the switching circuit comprises an optocoupler switch, and an output end of the optocoupler switch is electrically connected with the second electrode and the third electrode, and the switching circuit is switchable between the first working state and the second working state by turning on and off the optocoupler switch.

10. An electronic terminal, comprising:
    a capacitive touch screen;
    an active capacitive pen compatible with the capacitive touch screen, wherein the active capacitive pen comprises:
    a barrel;
    a first electrode disposed at an end of the barrel, wherein the first electrode is configured to send a signal to the capacitive touch screen, and an end of the first electrode away from the barrel serves as a tip of the active capacitive pen;
    a second electrode disposed on the barrel and spaced apart from the first electrode in an axial direction of the barrel, wherein the second electrode is configured to receive a signal transmitted from the capacitive touch screen and transmit a signal to the capacitive touch screen;
    a third electrode disposed on the barrel and located between the first electrode and the second electrode in the axial direction of the barrel; and
    a switching circuit connected with the second electrode and the third electrode, wherein the switching circuit is configured to electrically connect the third electrode with the second electrode in a first working state and disconnect the third electrode from the second electrode in a second working state,
    wherein in the first working state, the second electrode and the third electrode jointly serve as a signal transmitting and receiving electrode, to enable the active capacitive pen to be compatible with a first protocol; in the second working state, merely the second electrode serves as a signal transmitting and receiving electrode, to enable the active capacitive pen to be compatible with a second protocol.

11. The active capacitive pen according to claim 10, wherein the switching circuit is further configured to ground the third electrode in the second working state.

12. The active capacitive pen according to claim 10, wherein the second electrode is ring-shaped and disposed on the barrel around the axial direction, and a distance between a lower edge of the second electrode and the end of the first electrode in the axial direction of the barrel is not less than 5.8 mm.

13. The active capacitive pen according to claim 3, wherein the third electrode is ring-shaped and disposed on the barrel around the axial direction, and a distance between a lower edge of the third electrode and the end of the first electrode in the axial direction of the barrel is not more than 3.7 mm.

14. The active capacitive pen according to claim 13, wherein a length of the first electrode in the axial direction of the barrel is 3.5 mm to 3.7 mm.

15. The active capacitive pen according to claim 5, wherein a length of the third electrode in the axial direction of the barrel is 2.1 mm to 2.4 mm.

16. The active capacitive pen of claim 12, wherein a length of the second electrode in the axial direction of the barrel is 3.0 mm to 6.4 mm.

17. The active capacitive pen according to claim 16, wherein the length of the second electrode in the axial direction of the barrel is 3.0 mm to 3.5 mm.

18. The active capacitive pen according to claim 10, wherein the switching circuit comprises an optocoupler switch, and an output end of the optocoupler switch is electrically connected with the second electrode and the third electrode, and the switching circuit is switchable between the first working state and the second working state by turning on and off the optocoupler switch.

* * * * *